(12) United States Patent
Starkey

(10) Patent No.: US 7,039,658 B2
(45) Date of Patent: May 2, 2006

(54) METHOD AND APPARATUS FOR GENERATING WEB PAGES FROM TEMPLATES

(76) Inventor: James A. Starkey, 13 Tucks Point Rd., Manchester, MA (US) 09144

( * ) Notice: Subject to any disclaimer, the term of this patent is extended or adjusted under 35 U.S.C. 154(b) by 494 days.

(21) Appl. No.: 09/919,052

(22) Filed: Jul. 31, 2001

(65) Prior Publication Data

US 2002/0059327 A1 May 16, 2002

Related U.S. Application Data

(60) Provisional application No. 60/221,946, filed on Jul. 31, 2000.

(51) Int. Cl.
G06F 17/30 (2006.01)

(52) U.S. Cl. ............ 707/203; 707/201; 715/501.1
(58) Field of Classification Search ......... 707/1–10, 707/100–104.1, 200–206; 715/501.1, 513, 715/522–524; 345/760, 730–731; 709/217, 709/219, 200
See application file for complete search history.

(56) References Cited

U.S. PATENT DOCUMENTS

| | | | | |
|---|---|---|---|---|
| 5,987,480 A | * | 11/1999 | Donohue et al. | 715/501.1 |
| 6,212,530 B1 | * | 4/2001 | Kadlec | 707/201 |
| 6,212,536 B1 | * | 4/2001 | Klassen et al. | 715/513 |
| 6,230,173 B1 | * | 5/2001 | Ferrel et al. | 715/513 |
| 6,584,480 B1 | * | 6/2003 | Ferrel et al. | 715/513 |

* cited by examiner

Primary Examiner—Shahid Alam
Assistant Examiner—Jean Bolte Fleurantin
(74) Attorney, Agent, or Firm—George A. Herbster

(57) ABSTRACT

A method and apparatus for facilitating the development and management of web sites. A web page generator includes applications for controlling web page operations or semantics and a plurality of templates for controlling the appearance of a web page. A templates manager object establishes Template Set Objects and Template Objects for each application on a dynamic basis. Applications use this dynamic hierarchy to identify specific templates for use, even templates in the same or different applications with the same name.

26 Claims, 18 Drawing Sheets base.DrlTable

```
<table border>  ~104
<iteration type=columns>  ~105
    <tr><td><b><% var.name></b></td><td><drlItem></td></tr>
</iteration>
</table>
```

FIG. 5B

MuniWeb.drlPage: table=A

```
<pageHeader title=%fld.what>
<h2><center><%fld.what></center></h2>
<table>
<tr><td><b>What:</td><td><%fld.what></td></tr>
<tr><td><b>When:</td><td><%fld.day>  <%fld.time></td></tr>
<tr><td><b>Where:</td><td><%fld.location></td></tr>
<tr><td><b>Who:</td><td><%fld.subcommittee></td></tr>
<if %fld.agenda>
<tr><td valign=top><b>Agenda:</td><td><%fld.agenda></td></tr>
</if>
<if %fld.miuntes>
<tr><td valign=top><b>Minutes:</td><td><%fd.Minutes></td></tr>
</table>
<editPage>
<pageTrailer>
```

FIG. 5C

METHOD AND APPARATUS FOR GENERATING WEB PAGES FROM TEMPLATES

This application claims the benefit of provisional application Ser. No. 60/221,946 filed Jul. 31, 2000.

BACKGROUND OF THE INVENTION

1. Field of the Invention

This invention generally relates to the production of documents, particularly web pages for transfer over communications paths, such as the Internet, and more specifically to a method and apparatus for facilitating the processes by which such documents are developed and transmitted.

2. Description of Related Art

A significant number of industries now use web pages to communicate information over the world wide web or Internet. Web servers transmit these web pages in response to requests from users on the Internet. Simple web pages may merely convey information as a static page. More complex web pages allow user interaction to select categories of information. Still others allow users to effect commerce through the purchase of goods and services.

Some companies use the Internet as an adjunct to their businesses. Other businesses deal exclusively over the Internet. They rely entirely on the transmittal of web pages by a web server to a user. As a result there is a requirement that a web site be current, and this necessitates a web page developer or designer to produce additional web pages and to modify the content of and the appearance of web pages from time to time.

The increasing demand for producing and maintaining such web pages has spawned a web page development industry. Large numbers of individuals and organizations now develop and maintain web pages for their own purposes and for use by others. These web page developers use one of two dominant approaches for web page development. With one, the web page developer actually writes code that defines the appearance of each web page and establishes all the control for controlling dynamic content within a web page and web page sequences (i.e., web page "semantics"). When the web server processes the code, it generates a string that produces the code necessary to display the header and body of each web page, such as the predominate HTML code. Any change to the semantics or appearance of a web page requires a developer to modify the code. To add a web page that is based almost entirely on a previously developed web page, all the code for that prior web page must be copied and then modified. The process for changing such code can be very time consuming and complex even in dealing with some simple web pages.

U.S. Pat. No. 5,987,480 to Donohoue et al. depicts an example of a second approach sometimes referred to as a "active page server" tool. In accordance with this approach, a web page server stores the HTML, or other code required for generating a web page, such as HTML code, with all the header and body information as a complete web page or template. These pages include the HTML code that controls the appearance of the web page and other code that controls web page semantics. In the Donohoue et al. patent this other code uses "@" as a symbol that defines paired delimiters. During the processing of a particular web page or template, a web server locates these symbols or delimiters. The web server then interprets each character string between paired delimiters. In the Donohoue et al. patent, these character strings can define a dynamic tag, an "if" instruction or a "loop" instruction. If the character string defines a dynamic tag, the value generated by the dynamic tag replaces the corresponding paired delimiters and dynamic tag. If the character string defines an "if" instruction, the system performs a defined action if a defined condition is met. If a "loop" instruction is included, all the values during each loop operation replace the paired delimiters and "loop" instruction. Once all this information is complete, the web server sends the HTML code with the embedded values to the browser. As with the first approach, a web page or template in an active page system also establishes web page semantics.

The merging of web page semantics and appearance in the code for a web page in either approach introduces complexities for developers that are difficult to manage and track. As an example, the Donohoue et al. patent describes different versions of a web page available for different browsers. Each web page then must include some means of determining the conditions under which it, rather than a parallel web page, is selected for display. In the Donohoue et al. patent the path for the web page is changed. If a web page exists, the system changes the URL address. At many web sites, different individuals may have general or special access to the web page server. In this case it may be desirable to make some pages if available to both users with both general and special access privileges and to make other web pages only available to users with special access privileges. In still other web page applications it may be desired to use the same basic web page to display different information from different data tables that supply this information. Prior art web servers contain a separate web page for each application.

In many cases a web site is actually located in two sites. A working version is located on an on-line web server. A copy of that version, working revisions, past versions and information for other web sites (e.g., other instantiations) may also reside on the developer's server or development system. Generally a web developer isolates each of the instantiations. If they do not, a change in one could produce changes in another. For example, assume a developer produces a web site version and installs it on a web server. Then assume at a later date a change is made to the developer's development system. This can cause or require changes to the web site on the development system that would not be accepted on the web server. Consequently, these situations further complicate web site development and management.

With this background, it will be apparent that, the management of variations and changes in such sophisticated web page servers becomes extremely difficult. What is needed is a web page server that enables web page developers to generate web page applications that separate web page semantics and appearance information and that enables a developer to build applications that can benefit from prior developments of other applications.

SUMMARY

Therefore it is an object of this invention to provide a method and apparatus that facilitates the development of web page applications.

Another object of this invention is to provide a method and apparatus for facilitating the development of web page applications by separating web page semantic and appearance information.

Still another object of this invention is to facilitate web page development by simplifying the process for developing web pages.

In accordance with one aspect of this invention, a web page generator for supplying web pages for display by a browser comprises template and application stores, an interface, an application manager and a templates manager. The template store contains a plurality of templates, each template having a name, a body and selection criteria with at least two templates having the same name. The application store contains at least one application that identifies templates by name. The interface generates a modified user request that identifies one of the applications in the application store in response to a user request from a browser. The application manager responds to the modified user request by processing a selected application including an identification of all the templates in the template store related to the application. The template manager selects one of the templates in the template store according to a template name and selection criteria from the application manager, the application manager producing a representation of a web page in response to the body of each selected template that the interface converts into a form that is compatible with the user's web browser.

In accordance with another aspect of this invention, a web page development system comprises templates and application stores, a web page development module and a templates manager. The template store contains templates, each template having a name, a body and selection criteria. The application store contains applications that include references to templates by name. The web page development module enables the development of a new web page and enables the saving of any new template in the template store. The templates manager generates a template set object for that application that identifies template objects and corresponding templates. The templates manager includes modules for responding to the act of saving a new template for a given application by retrieving the template set object for the given application, for generating a template object including the new template name and reference to the given application, and for adding the new template object to the template set object at a predetermined location therein.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 5A through 5C depict the content of specific examples of the templates shown in FIG. 4;

DESCRIPTION OF ILLUSTRATIVE EMBODIMENTS

Figure 1:
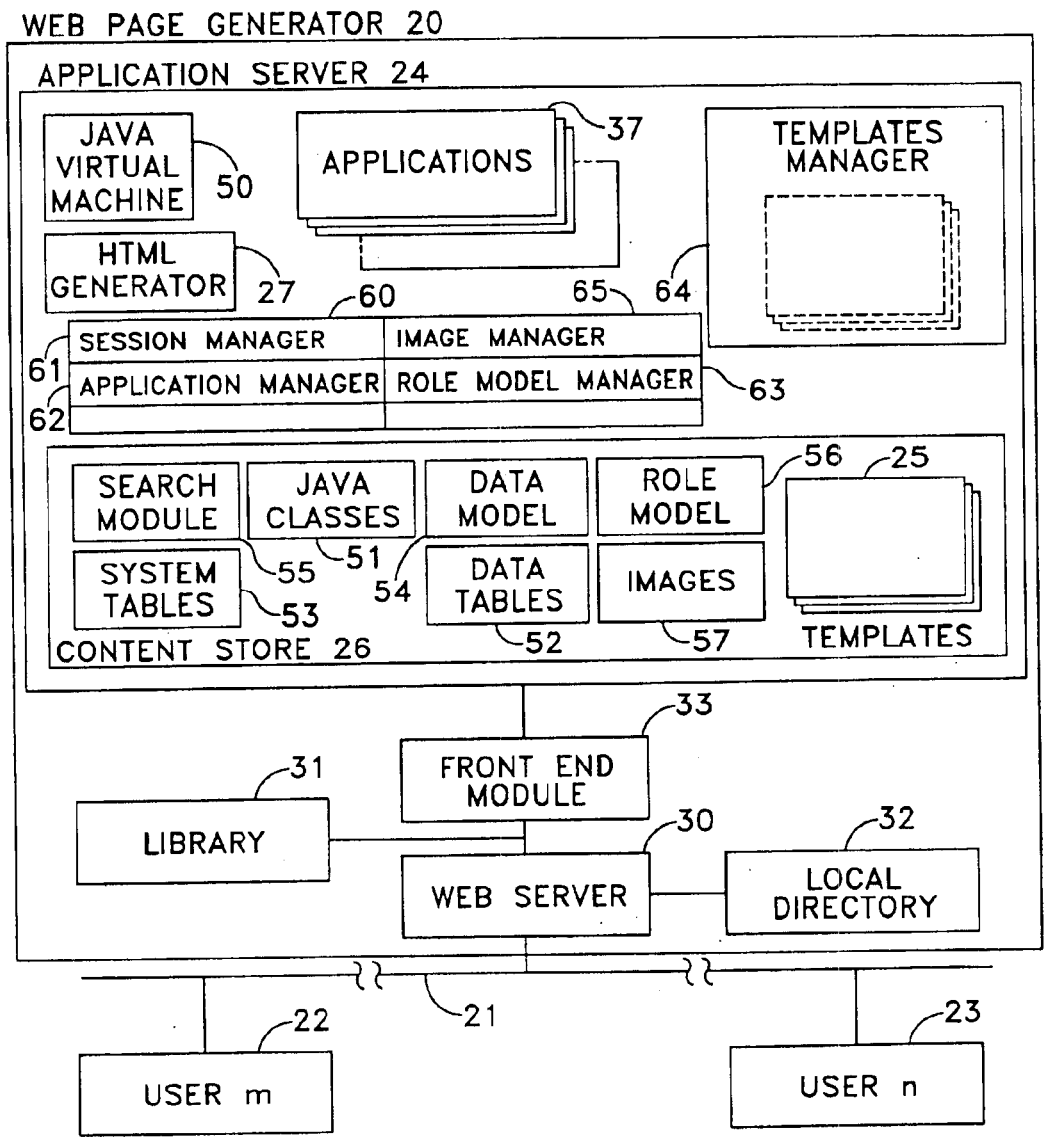
FIG. 1 depicts a web page generator incorporating this invention with connections to users over the Internet.

FIG. 1 depicts a web page generator 20 that can be used as a development system or as an on-line web page server. When used as a web page server, the web page generator attaches to the world wide web or internet that FIG. 1 depicts as a communications path 21. The communications path 21 allows users, such as USERm 22 and USERn 23, to communicate with the web page generator 20, generally through browsers. As known, a user makes a request through a browser by identifying a URL address. The web page generator 20 receives that address and returns information, generally in HTML code, to the requesting user's browser. The browser then converts that code into a visual web page.

Whereas prior art web page servers include a store for web pages, the web page generator 20 of this invention does not store any static or dynamic web pages. Rather an application server 24 incorporates a number of modules including a templates portion 25 in a content store 26. Each template, as described more fully later, contains certain control information and headers and body written in HTML or other corresponding code, such as HDML code. An HTML generator 27, or corresponding generator for other code types, then generates the corresponding HTML or other code for transfer back to the requesting user for interpretation and display by the browser.

The web page generator 20, may include multiple application servers, such as the application server 24. It also includes a web server 30, a library 31, a local directory 32 and a front end module 33. The web server 30 can access information in the library 31 and, in some cases, the local directory 32, to select a specific application server, such as the application server 24, in response to a browser request. When an application server generates the HTML or other code, the front end module 33 and web server 30 transfer the code to the user's browser. Information stored in the library 31 and local directory 32 may also be used during such transfers.

Figure 2:
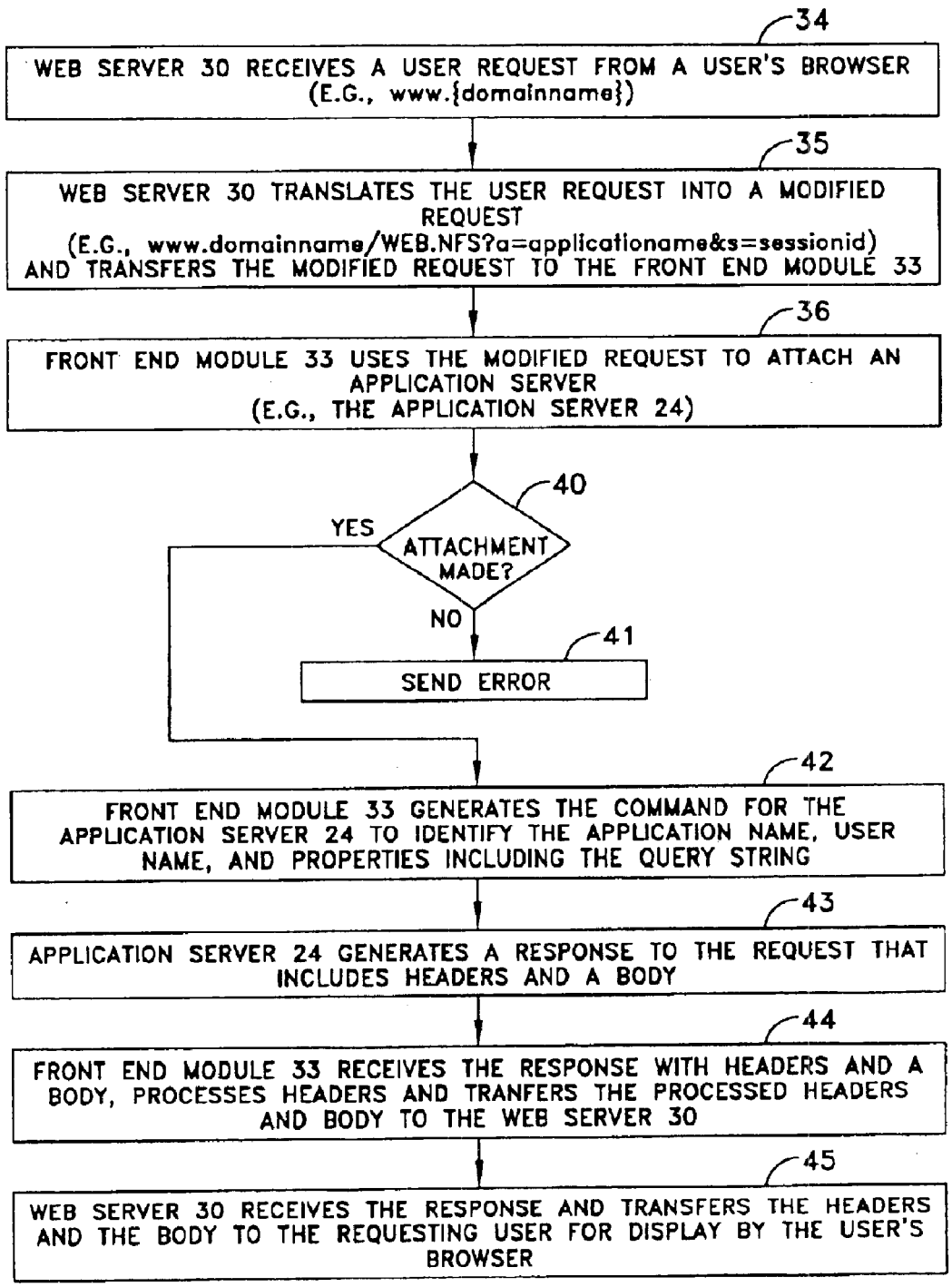
FIG. 2 is a flow chart that depicts the general operation of a web page generator shown in FIG. 1.

More specifically, when a user, such as USERm 22, desires to communicate with a web page generator, the USERm 22 through a browser generates a user request having any standard form, such as "www.domainname", and including other information such as the user's address and browser type, as known. Referring now to FIGS. 1 and 2, the web server 30 receives that user request in step 34. Step 35 translates that user request into a modified form, specifically:

www.domainname/WEB.NFS?a=applicationname&s=session_id wherein everything to the right of the "?" constitutes a query string. Step 35 transfers this modified request to the front end module 33. In step 36 the front end module 33 uses the modified request to attach to an application server containing the named application, the application server selection being based on the information to the left of the "?".

In FIG. 1 the application server 24 includes a plurality of named applications 37. If the attempt to attach the application server 24 fails, step 40 transfers control to generate an error message at step 41. Normally however, the attachment will be made, so control passes from step 40 to step 42.

Now the front end module 33 generates a command for the application server. This command identifies the application name, the user name and various properties gleaned from the user request including the query string.

In step 43 the application server 24 generates a response to the request. As described more specifically later, the application server 24 will select a particular application and one or more of named web page templates and process those templates to produce headers and a body as a response in HTML code or other appropriate code, such as HDML code, depending upon the browser type.

The front end module 33 receives that response in step 44, processes the headers and transfers the processed headers and body to the web server 30. In step 45 the web server 30 receives the information from the front end module 33 and transfers the headers and body to the requesting user for display by the user's browser.

The foregoing description in connection with FIG. 1 and particularly FIG. 2, generally applies to all web servers with the exception of step 43. Step 43 broadly defines the generation of a response. While all application servers will generate a response to a request that includes headers and a body as defined in step 43, an application server embodying this invention has a logical organization and operation that differs from prior art application servers. The remaining steps in FIG. 2 are generally known and define the operations with sufficient detail to enable their implementation using conventional techniques.

Application Server Organization

In accordance with one of the objects of this invention, the application server 24 has an organization and operation that separates web page semantics and web page appearance functions. This separation can simplify web site administration including web site development and enables the ready incorporation or inheritance of prior web site developments. It also facilitates the transfer of a web page application from a development system to an on-line web server. In accordance with one aspect of this invention, web page applications 37 contain the semantics information. In a specific embodiment web page applications 37 are implemented in JAVA code. Consequently the application server 24 includes a JAVA virtual machine 50 and application specific JAVA classes 51 in the content store 26 that enable all operations required by the applications 37 to be performed. An industry standard external library file, not shown but known in the art, contains JAVA classes that are relevant to all applications.

The application server 24 also includes a relational database with data tables 52 in the content store 26 that contain the data. In accordance with conventional relational data management architecture, the content store 26 also includes system tables 53 that define the various data tables 52 and a data model 54 that contains information about the data stored in the data tables 52. A search module 55 enables an application to generate queries that produce result sets containing data from the data tables 52 utilizing the information in the system tables 53 and data model 54. As a person of ordinary skill in the relational database management arts will understand the structure and operation of these modules, it is sufficient to know that the search module can process a query string and return a result set that the applications 37 can access to retrieve or modify data in the data table 52.

The content store 26 also includes a role model 56. In many applications it is desirable to assign different privileges to different individuals. The role model defines different roles and the characteristics of each role. For example, the role model for a "user" might define access to any application level, a user level and a member level. The role model for an "administrator" might define the foregoing roles plus the roles of "administrator" and "designer".

The content store 26 also includes images 57. These images are stored in conventional format and include image names, aliases and other context information.

The application server 24 additionally includes a number of "managers" 60. A session manager 61 maintains the relationships with different users accessing the web page generator 20. Such session managers are known in the art. An application manager 62 keeps track of "instances", users and other properties in order to assure proper functioning of different applications. A role model manager 62 keeps track of individuals and their assigned privileges and roles. Role models and role model managers are known in the relational database management art.

As previously indicated, the content store 26 contains all the templates in the template portion 25. Each template has a name. In accordance with one aspect of this invention multiple templates can have the same name even in the same application. Moreover, an application at one layer can inherit templates from a lower application layer or the base layer. A templates manager 64 serves as an interface between the applications 37 and the templates in the templates portion 25. Generally speaking, the templates manager 64 uses an application name and a template name generated by the application to return to the application one or more templates by generating a hierarchy of related template objects and selecting one or more of the templates objects from that hierarchy to identify the templates that are retained for use by the application. This templates manager 64 is at the heart of this invention. It particularly facilitates web page development and the generation of responses that will produce a web page image at a browser.

Application Server Operation

Figure 3A:
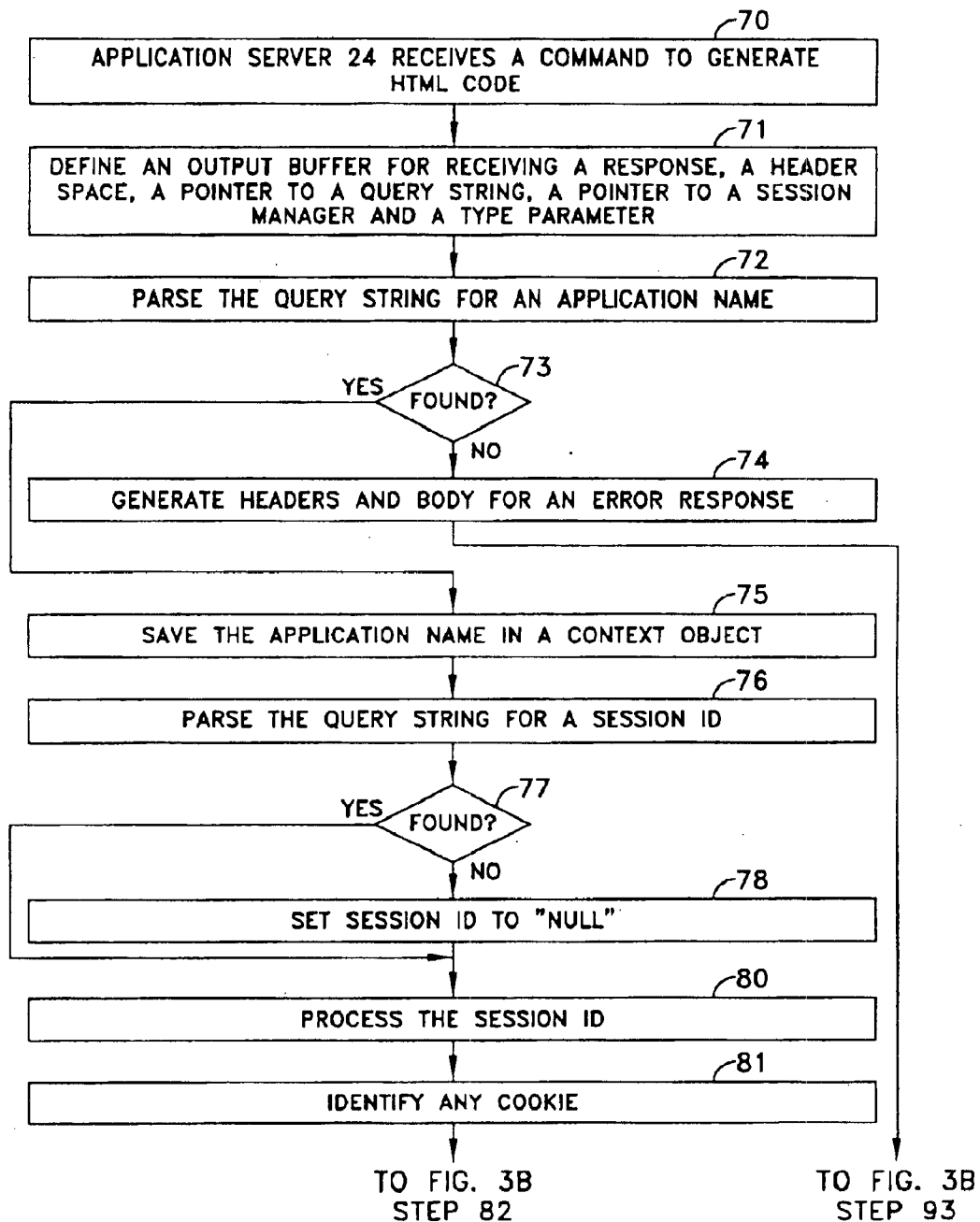
FIGS. 3A and 3B depict the general operation of an application server in the web page generator shown in FIG. 1.

Before describing the structure and operation of the templates manager 64 and its related objects and methods it will be helpful to understand a more detailed operation of the applications server 24. At FIG. 3A, at step 70 the application server 24 receives a command to generate an HTML, or other code. In step 71 the application server 24 defines a number of structures including an output buffer for receiving a response, header space, a pointer to a query string, a pointer to a session manager and a type parameter. Step 72 parses the query string for an application name. In the prior example the query string is:

a=applicationname&s=session_id

Figure 3B:
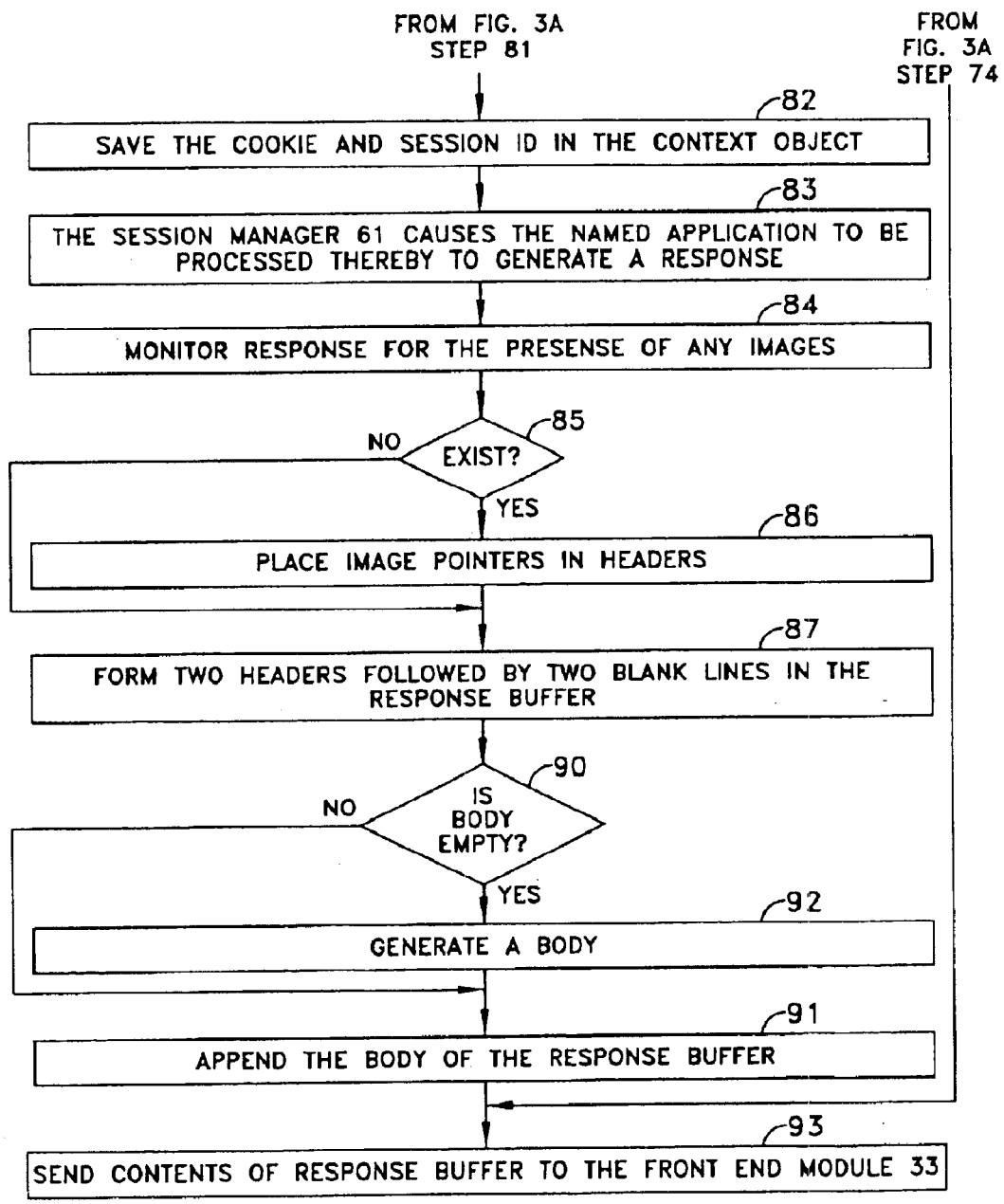

The application manager 62 uses the application name to determine whether any of the applications 37 matches that name. If not, step 73 transfers control to step 74 that generates headers and a body for an error response to be sent back to the user. When a matching application is found, control passes from step 73 to step 75 that saves the application name in a context object. As each application is called, the response in FIGS. 3A and 3B establishes a context object with specific information including the application name and other items of information as hereinafter described.

Step 76 parses the query string for a session ID. If this is a first session, there will be no session ID and step 77 transfers control to step 78 to set the session ID to a null value. If a session ID exists and is valid that session ID will be used. In either case control passes to step 80 that processes the session ID. If step 78 sets the session ID to a null value, step 80 creates a new session and new session ID.

Next step 81 uses a conventional procedure to identify any "cookie". Thereafter step 82 in FIG. 3B saves the cookie and session ID in the context object.

In step 83 the session manager 61 invokes the JAVA virtual machine 50 to execute the named application to be processed to generate a response. The response will include all the code required for producing a web image at the user's browser. It is during this step that an application will interact with the templates manager 64 and, if necessary, with the image manager 65, and through the application manager 62 and the search module 55 to obtain any data or images to be returned with a web page image to the browser or to update or modify any information stored as images 57 or data tables 52.

The application server 24 uses step 84 to monitor the response for the presence of any images. If any exist, step 85 transfers control to step 86 to place the image pointers in various headers. In either case step 87 forms two headers, with or without image pointers, followed by two blank lines in the response buffer defined in step 71. This particular configuration follows standard syntax for an HTML web page.

Step 90 determines whether the body is empty. Typically the response will include a body whereupon control transfers to step 91 to append the body to the response buffer after the two blank lines. If the body is empty for some reason, control transfers to step 92 that generates a default body that step 91 appends to the response buffer.

In either case control transfers to step 93 that sends the response to the front end module thereby to complete step 43 in FIG. 2. If no application were found in step 73, then the generated headers and body for the error response generated in step 74 would transfer in step 93.

Templates

Each of the application programs 37 requires at least one template from the templates portion 25, or templates store, in the content store 26 for producing the code necessary to generate a web page image on a browser. This invention utilizes a series of objects and methods to manage the templates so that overloading and inheritance features can be realized. As previously stated, "overloading" allows two or more templates to have the same name. "Inheritance" enables one application to utilize templates from an existing application.

Figure 4:
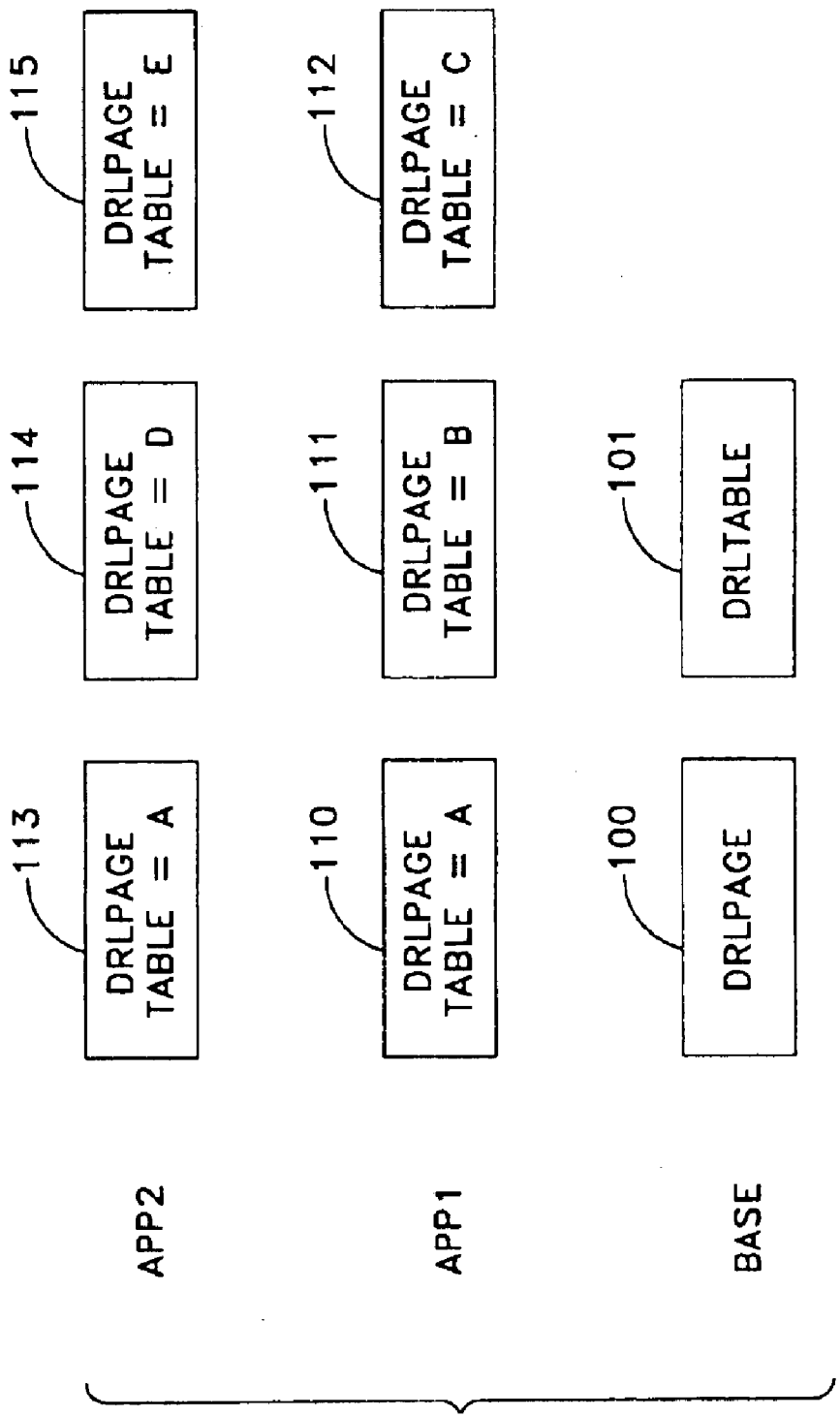
FIG. 4 graphically depicts a number of templates having the same template name associated with different applications.
Figure 5A:
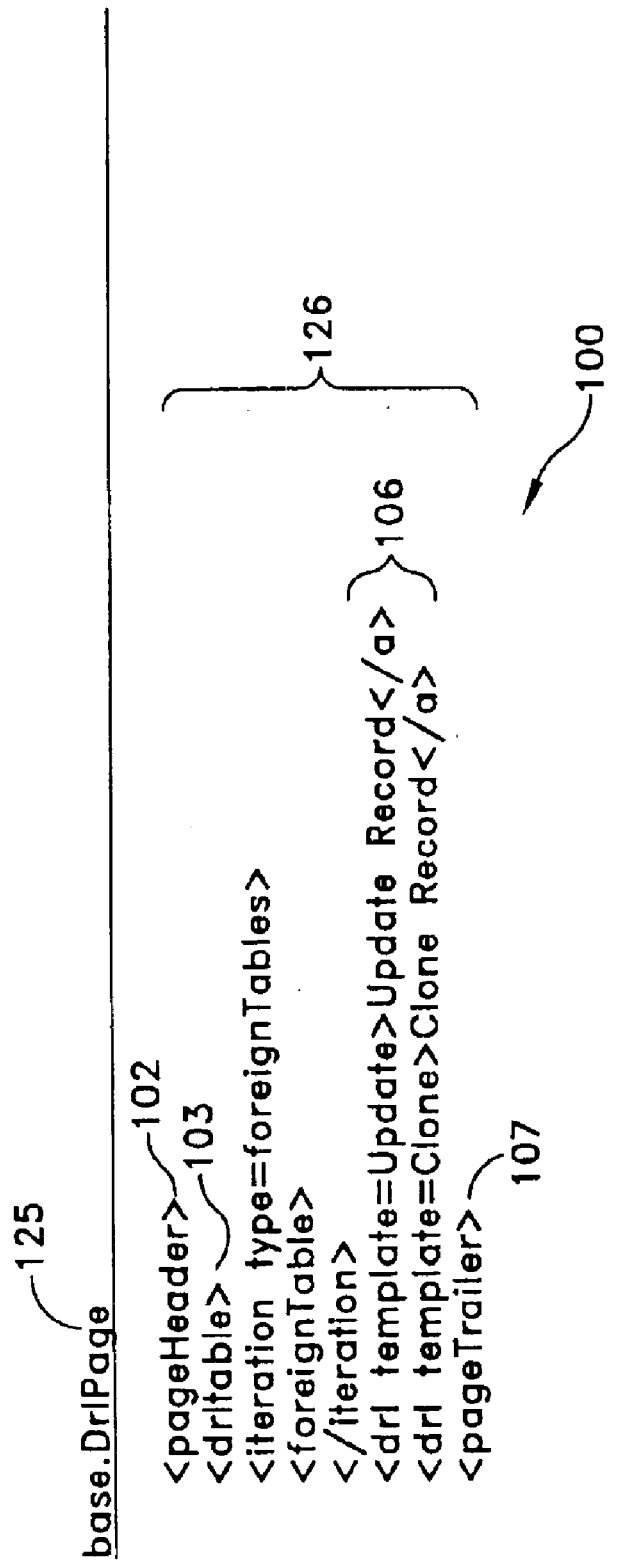

FIG. 4 depicts representative templates from the templates store 25 in the content store 26 including, in a base layer, a DrlPage template 100 and DrlTable template 101. FIG. 5A depicts the content of the DrlPage template 100. It includes a page header template at 102 and invokes the DrlTable template 101 at 103. The DrlTable template 101 in FIG. 5B specifies a border at 104 and provides a format at 105 for displaying columns as individual records in a result set are processed on an iterative basis. The statements at 106 are special statements that control the update of a current record in a result set. The body of the DrlPage template ends with a page trailer template 107. As will now be apparent, this structure allows one template to "call" another template. In fact one template can call any of several templates directly or indirectly (e.g., Template 1 calls Template 2 that, in turn, calls Template 3 and Template 4.)

As shown in FIG. 4, an APP1 application or layer lies above the base layer and includes three DrlPage templates 110, 111 and 112. They are each named "DrlPage", but each includes criteria by defining a particular table, Tables A, B and C for DrlPage templates 110, 111 and 112, respectively. Likewise a second application, APP2, is in a layer above the APP1 layer. It includes three DrlPage templates 113, 114 and 115. The DrlPage template 113 uses the same table reference as DrlPage template 110 (i.e., Table A). DrlPage templates 114 and 115 use Tables D and E respectively.

FIG. 5C depicts the DrlPage template 110. It defines a page header template at 120. Statements generally designated by reference numeral 121 define output lines to be generated for each record found in a result set. This particular template includes two conditional statements at 122 based upon the specific content of the information to be displayed by the DrlPage template 110. In this particular case, these conditions determine the presence of an "agenda" and of "minutes". These statements 122 have a semantic-like quality; however, the control provided by these statements is specific to the DrlPage template 110 and the data in the table specified in the criteria. Consequently, incorporating such conditional or like statements does not overly complicate management because they are primarily related to appearance and have no impact on other templates. They do not, for example, determine whether a specific template will be used. Those decisions are semantical and are made in the applications.

The statement 123 assures that the table information is added and statement 124 defines a page trailer template. In this example, the DrlPage template 110 copies the code from the DrlTable template 101 directly to the template rather than by incorporating it through a subroutine-like call. Statements 102 and 107 in FIG. 5A incorporate pageHeader and pageTrailer templates by subroutine-like calls.

Figure 6A:
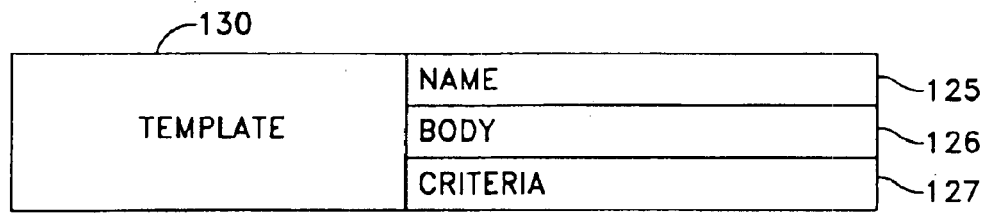
FIGS. 6A through 6D illustrate the structure of a template, a templates manager, a template set object and a Template Object, respectively.

FIG. 6A depicts the general structure of a template. It comprises a template name at 125, a body at 126 and criteria at 127. The DrlPage template 110 shown in FIG. 4 includes the name "DrlPage1" and the body shown in FIG. 5A. However, it has no criteria. The DrlPage template shown in FIG. 5C has the same name, a different body and criteria requiring Table A.

Templates Manager, Template Set and Template Objects and Methods

Figure 6B:

Whenever an application first requests a template, the templates manager 64 in FIG. 1 invokes an associated method. FIG. 6B depicts the templates manager object 130. It includes a hash table at 131 and application context at 132. There are two additional types of objects associated with the templates manager 64. These include a Template Set Object 133 shown in FIG. 6C and a Template Object 134 shown in FIG. 6D. The Template Set Object 133 in FIG. 6C defines the application name at 135, a hash table at 136, a collision chain slot at 137, an application link slot at 138, a template name slot at 139 and application context at 140. The Template Object 134 in FIG. 6D includes the template name at 141, a body at 142, criteria at 143, a collision chain slot at 144, a homonym chain slot at 145 and an application link slot at 146.

While the templates exist in the templates store 25 of the content store 26 and the templates manager 64 exists in the application server. However, the Template Set Object and the Template Object do not exist until an application requests a template and invokes a templates manager method.

Figure 6C:
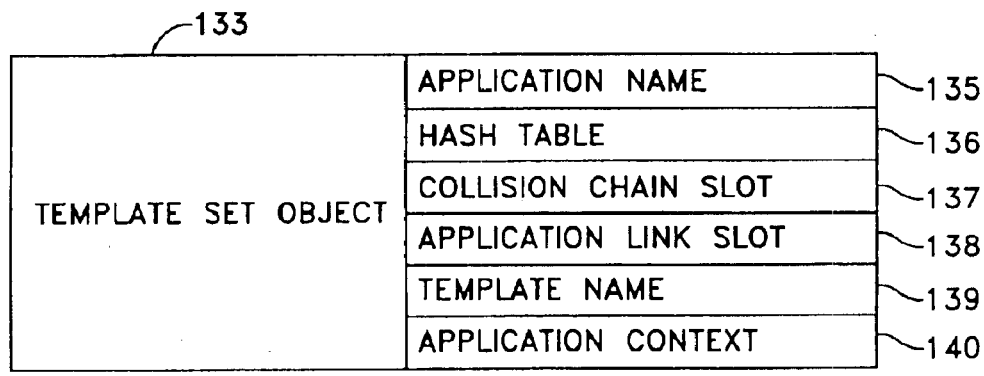
Figure 7:
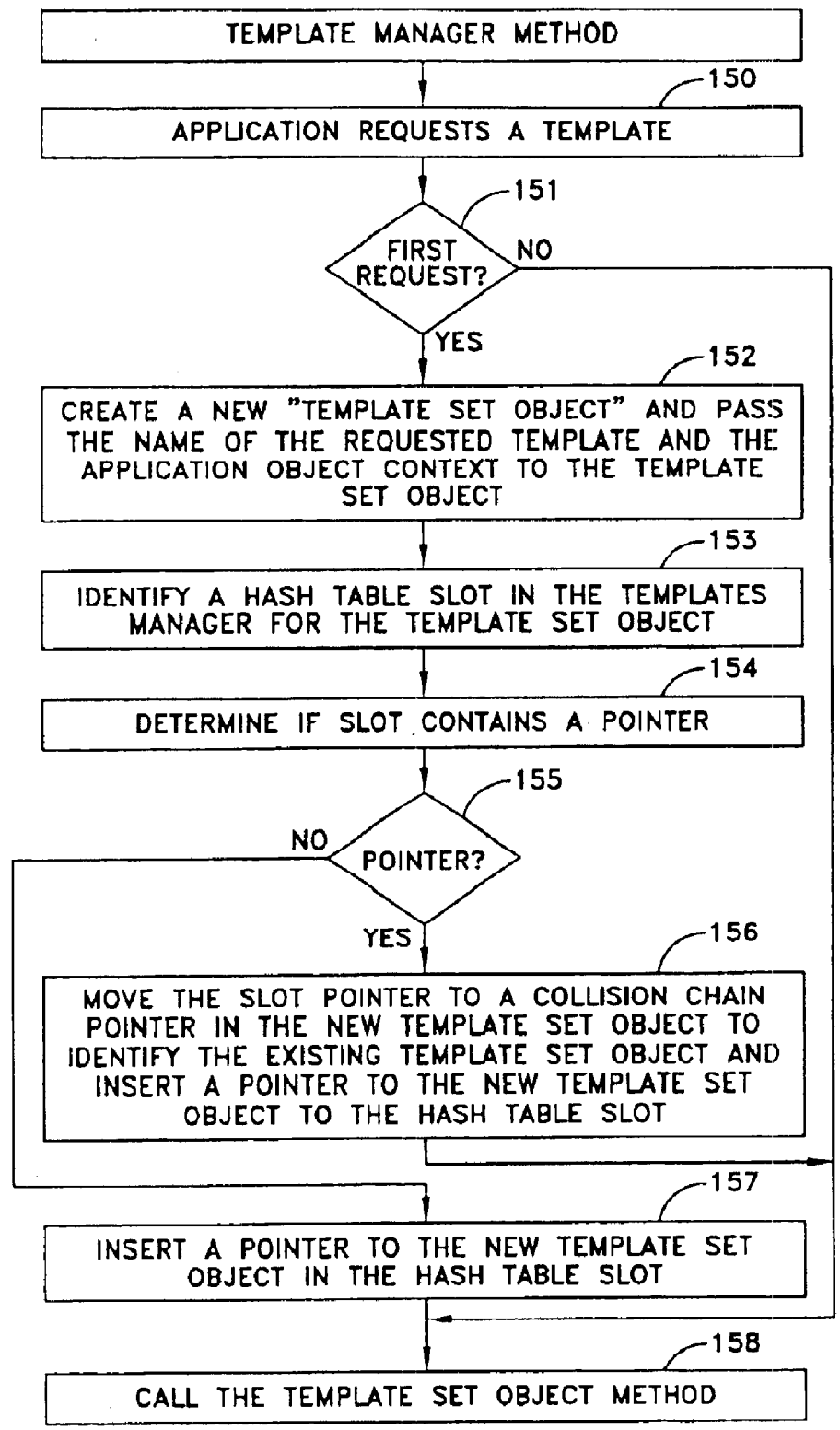
FIG. 7 depicts a templates manager method invoked when an application first seeks access to a template.

FIG. 7 depicts relevant portions of the templates manager method. When an application requests a template in step 150, step 151 of the templates manager method transfers control to step 152 if the request is a first request from the application. Step 152 dynamically creates a new Template Set Object according to the structure of the Template Set Object 133 shown in FIG. 6C. The method passes the names the application and requested template to locations 135 and 139 and passes the application context to location 140.

Step 153 hash codes the application name to identify a slot in the hash code table 131 and tries to store a pointer to the newly created Template Set Object in that slot. The hash table 131 has a finite size; in one specific embodiment, the hash table has 101 slots. It is therefore possible that the hash code could identify the same slot in the hash table 131 for two different application names. A collision chain segregates these applications. The collision chain establishes a list of Template Set Objects. The slots in the hash table 131 point to the head of each collision chain.

If step 154 determines that a prior Template Set Object exists, step 155 in the templates manager method transfers control to step 156 that inserts the new Template Set Object at the head of the collision chain. Specifically, step 156 moves the pointer at the corresponding slot in the hash table 131 to the collision chain slot 137 of the new Template Set Object thereby to identify the existing Template Set Object. Then step 156 replaces the pointer in the corresponding slot of the hash table 131 with a pointer to the new Template Set Object 133.

If no pointer exists in the slot of the hash table 131, step 157 inserts a pointer to the new Template Set Object in z that slot. When the collision chain slot entry or entries are completed by steps 157 or 156, step 158 calls the Template Object method. For second and succeeding requests control passes directly from step 151 to step 158.

Template Set Object Method

Figure 8A:
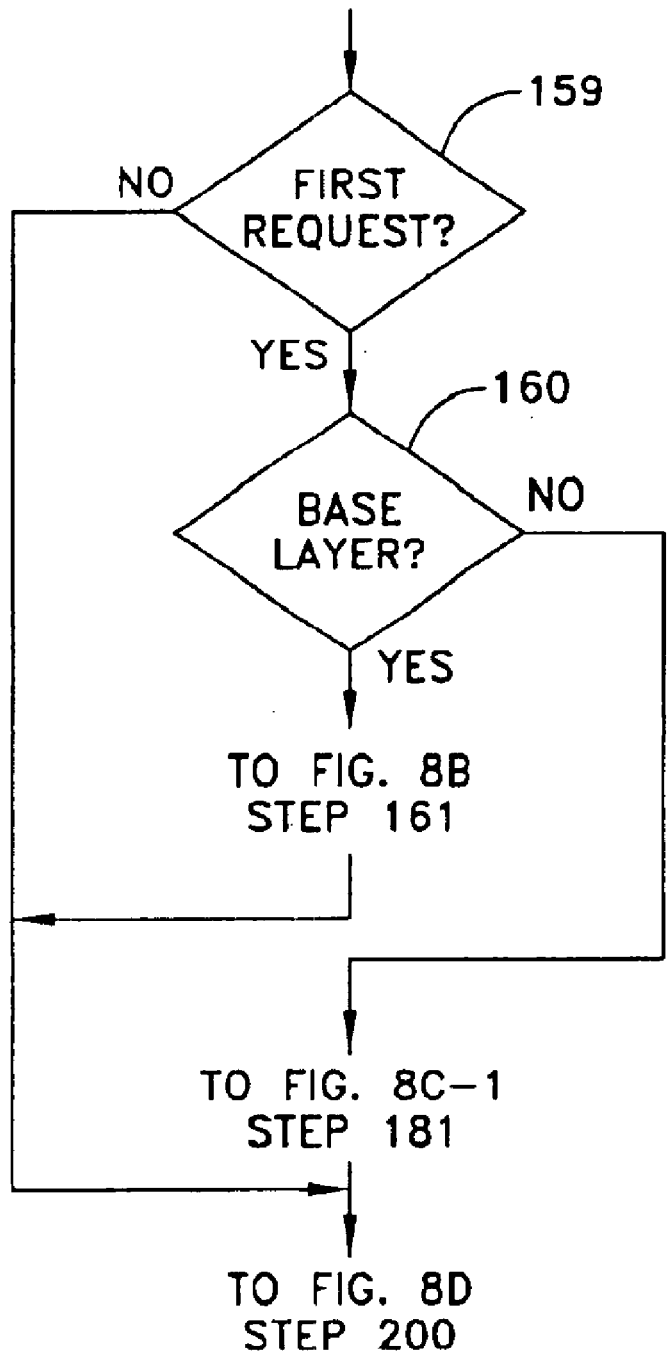
FIGS. 8A through 8D depict a template set object method invoked by the templates manager method of FIG. 7.

Now referring to FIG. 8A, if the Template Set Object method is being called for a first time, it is necessary to dynamically establish a hierarchy of related Template Objects representing the Templates stored in the templates store 25 of FIG. 1. Thus, if the Template Set Object is being called for the first time, step 159 transfers to control to step 160.

As previously described, the application server 24 establishes a base layer that includes generic templates, such as the DrlPage template 100 and DrlTable template 101 shown in FIG. 4. As a developer generates new applications, they are layered on top of the base layer in the order in which they are generated. Thus in FIG. 4, the APPL1 application was developed first; and the APPL2 application, second.

Figure 8B:
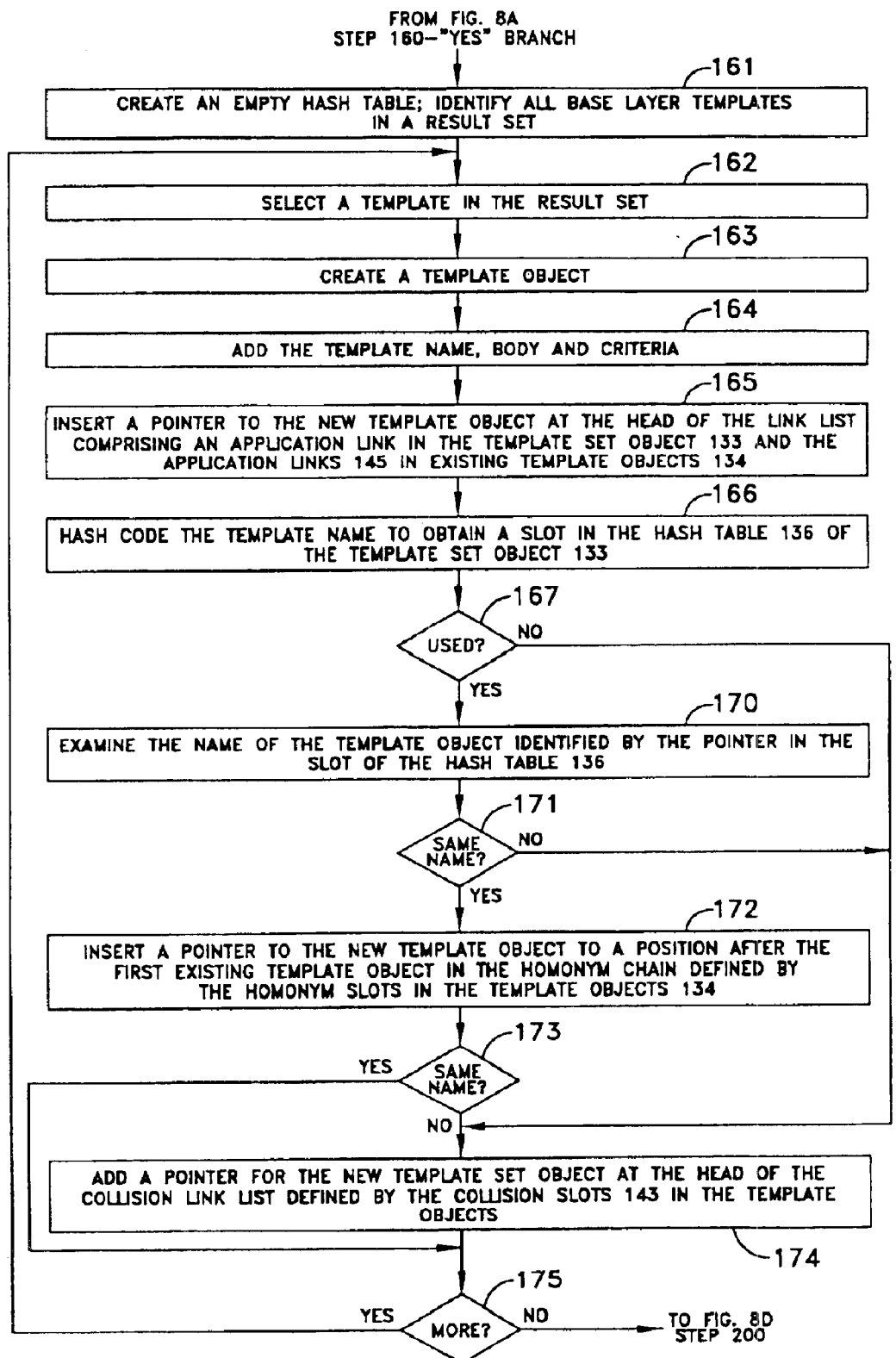

If a base layer application invokes its Template Set Object method, certain operations must occur that are different from those that occur when an application above the base layer invokes its Template Set Object method. If a base layer is involved, step 160 in FIG. 8A transfers control to step 161 in FIG. 8B that creates a new hash table corresponding to the hash table 136 in FIG. 6C. Step 161 also makes a query of the system tables 53 to generate a result set with the names of all the base layer templates, such as templates 100 and 101 in FIG. 4. Step 162 selects a first template from that result set. Step 163 then creates a Template Object with the name, body and criteria in locations corresponding to slots 141, 142 and 143 in FIG. 6D, respectively.

If this is the first template, step 165 inserts the pointer for the new Template Object in the application link slot of the Template Set Object (i.e., a slot corresponding to the application link slot 138 in FIG. 6C). If this is a second or succeeding template, step 165 places the pointer from the Template Set Object application link slot for the Template Object, as in the slot 146 in FIG. 6D. Then step 165 places the pointer for the new Template Object in the application link slot of the Template Set Object, such as the application link slot 138 in FIG. 6D. Thus the pointer to each succeeding Template Object is pushed onto the head of the application link for that application.

Step 166 then generates a hash code based upon the name of the template. If the one of the DrlPage templates associated with the applications is selected, the hash code will be based upon the string "drlpage". The hash code then identifies a slot in the hash table of the new Template Set Object, such as the hash table 136 in FIG. 6C. As described with respect to the Template Set Object, it is possible that different names for Template Objects will generate the same hash code. If the slot in the Template Object hash table has been used, such a condition exists. Step 167 then transfers control to step 170.

As also previously discussed and shown by way of example in FIG. 4, different templates can have the same name. Moreover, templates of the same name can be located in different applications, in the same application or in both. Step 170 determines whether any Template Object lying along the collision chain has the same name. If one exists, step 171 transfers control to step 172 that inserts the new Template Object in the homonym chain after a first previously processed Template Object. That is, step 172 moves the Template Object to the head of the list and moves the pointer in its homonym chain slot to the homonym chain slot for the new Template Object. Step 122 also inserts the pointer to the new Template Object in the homonym slot of the Template Object at the beginning of the list.

After step 172, the Template Set Object method uses step 173 to determine whether the template being analyzed is from the same layer (i.e., the base layer). If it is not, step 173 enables step 174 to manipulate the pointers in the collision chain to place the new Template Object at the head of the collision chain. Otherwise control passes to step 175.

If the template name has not been used previously, step 167 transfers control to step 174 that places the new Template Object at the head of the collision chain. If the template being analyzed does not have the same name as another template in the collision chain, step 171 bypasses steps 172 through 173 to enable the operation in step 174. When control reaches step 175 from steps 173 or 174, step 175 determines if any additional templates remain in the result set. If additional templates exist, control passes back to step 162. Otherwise this portion of the Template Set Object method is complete and control transfers to FIG. 8D.

Figures 1, 8C:
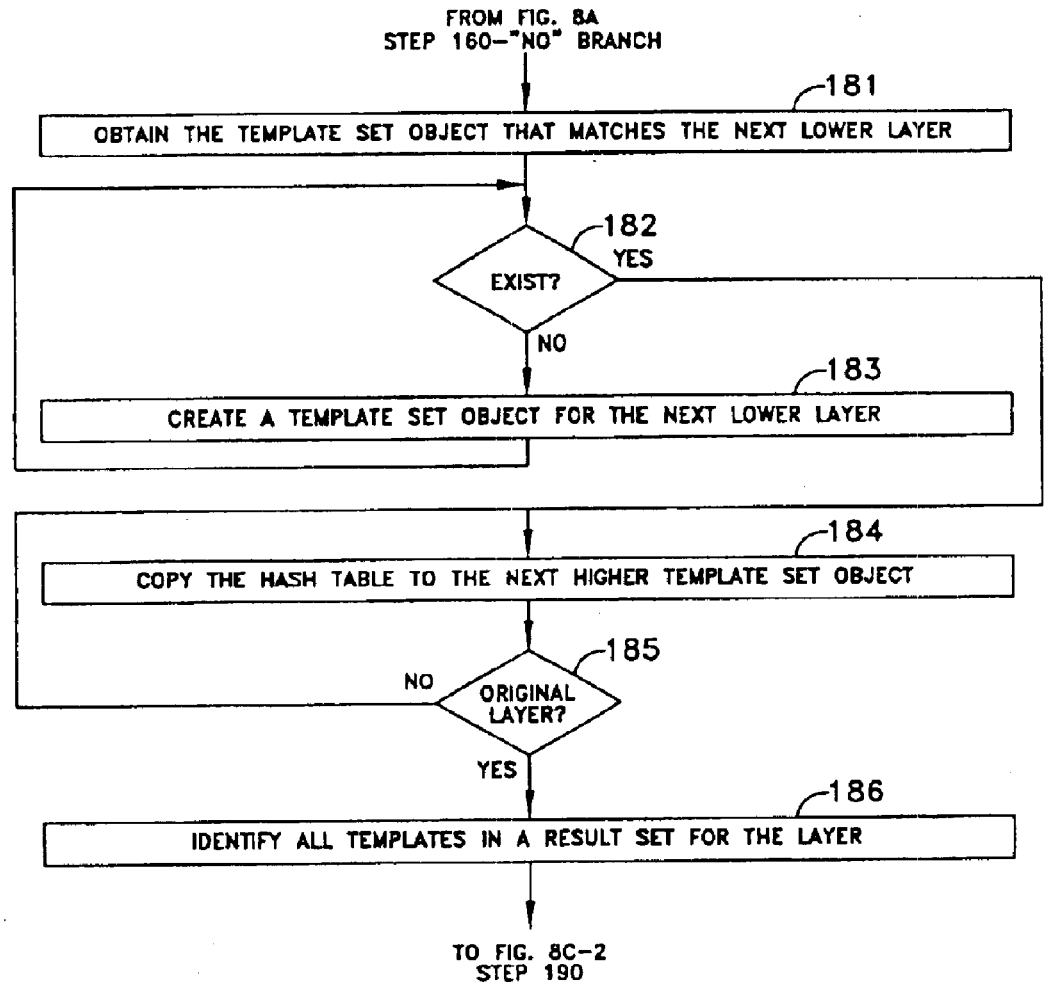
Figures 2, 8C:
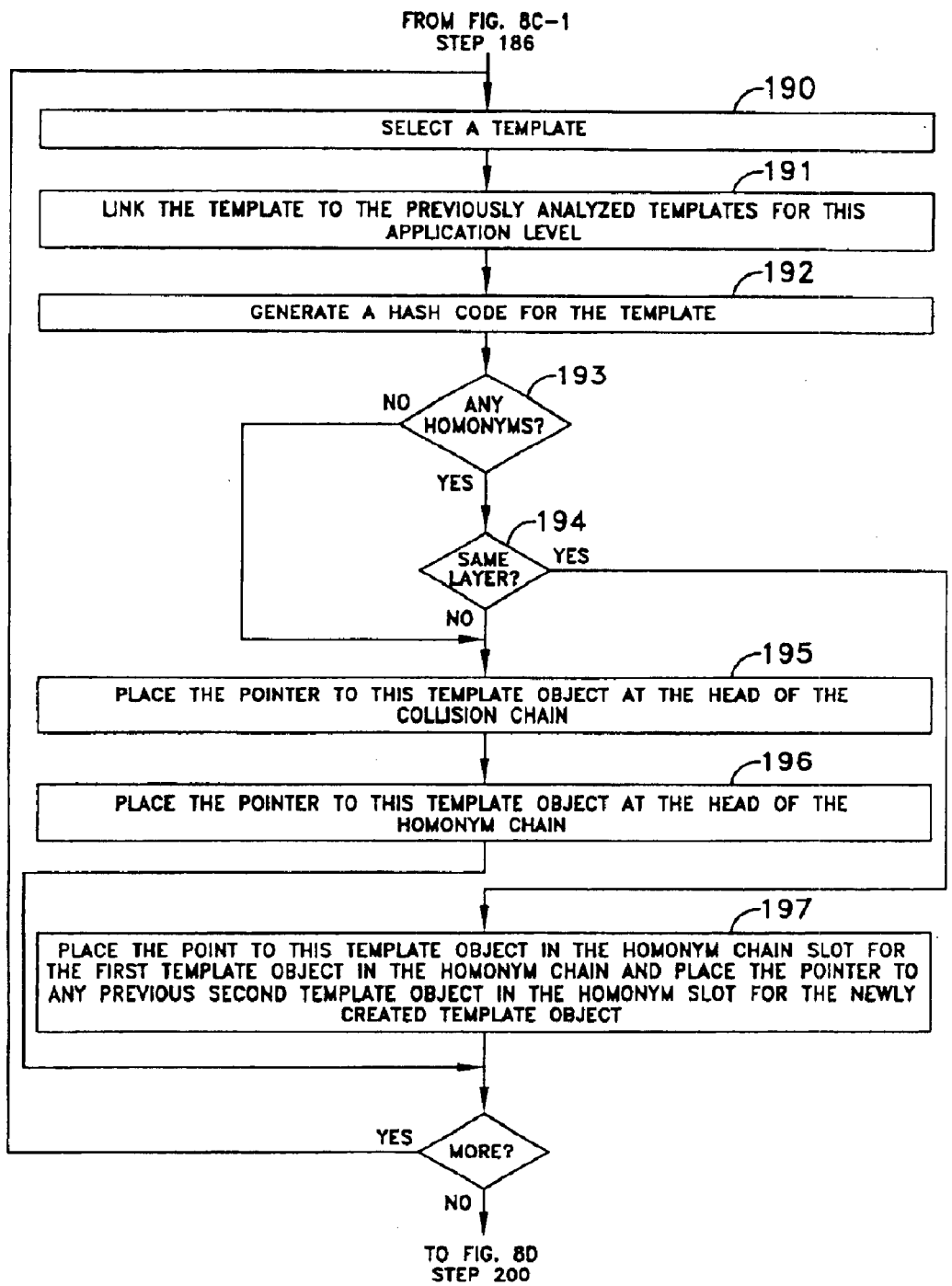

Referring again to FIG. 8A, when an application program invokes the Template Set Object method for the first time and the application is at a layer above the base layer, steps 159 and 160 transfer control from FIG. 8A to step 181 in FIG. 8C-1. Referring to FIG. 8C-1, step 181 uses the templates manager method to obtain a matching Template Set Object from the next lower layer. If step 182 determines that no corresponding Template Set Object exists at the next lower layer, step 183 creates a corresponding Template Set Object for that next lower layer. Steps 182 and 183 continue to loop until such a Template Set Object is found. When that preexisting Template Set Object is found at a given layer, the method copies the hash table from the preexisting Template Set Object to the new Template Set Object. If the new Template Set Object is not in the original layer, step 185 returns control to step 184 to copy the hash table to the newly created Template Set Object at the next higher level. This loop or recursion continues until the new Template Set Object associated with the original layer has been processed. When step 185 transfers control to step 186, the Template Set Object for the layer has inherited all the relationships of the corresponding Template Set Objects from the lower layers.

Once the Template Set Object for the layer has been created, step 186 uses the system tables 53 in FIG. 1 to identify all the templates for that layer. For example, in FIG. 4, generating the Template Set Object for the DrlPage template 110 would identify the templates 110, 111 and 112 plus any other templates of any template name in that layer.

As shown in FIG. 8C-2, the Template Set Object method then analyzes each template in sequence to place that template in an appropriate position in the applications link chain, the collision chain and the homonym chain for that Template Set Object. Step 190 selects a template. Step 191 links that template into the head of the applications link chain for that layer. Then step 192 generates a hash code based upon the name for the template to specify a hash table slot in the Template Set Object for that application or layer.

Step 193 uses that hash code to start at the hash table slot and to follow the collision chain to identify any other templates with the same name. If no template has the same name or any template with the same name is in another layer, steps 193 and 194 transfer control to step 195 that places the pointer to the Template Object at the head of the collision chain. Step 196 then places the pointer at the head of the homonym chain for that Template Set Object.

If a homonym exists at the same layer, steps 193 and 194 transfer control to step 197. Step 197 places the pointer to the Template Object in the homonym chain slot for the first Template Object in the homonym chain and places the pointer to any second Template Object in the homonym chain in the homonym chain slot of the Template Object being created. This process locates the new Template Object immediately after the first Template Object, and ahead of any previously processed Template Objects, in the homonym chain.

After the Template Set Object method produces the Template Object for a specific template in the layer, step 198 returns control to step 190 to generate a Template Object for another template. When all the templates in the layer have been selected, step 198 transfers control to step 200 in FIG. 8D.

When the processes of FIGS. 8B or 8C-1 and 8C-2 are completed, a hierarchy of all the templates for the application exists. Application link slots, such as the application chain slot 138 in the Template Set Object of FIG. 6C, and the application chain slot in each Template Object in the same layer, such as the application chain slot 146 in FIG. 6D, link all of the Template Objects for a given layer. Each collision chain links each Template Object with templates names that generate the same hash code. If one or more layers have multiple Template Objects with the same name, the collision chain identifies a first one of the Template Objects. The homonym chain identifies any other Template Objects in the same layer and all other Template Objects in lower levels. Consequently, the homonym chain for a given Template Set Object identifies all the Template Objects with the same name at that application layer and any lower layer (i.e., that base layer, the application layer and any intervening application layers).

Figure 8D:
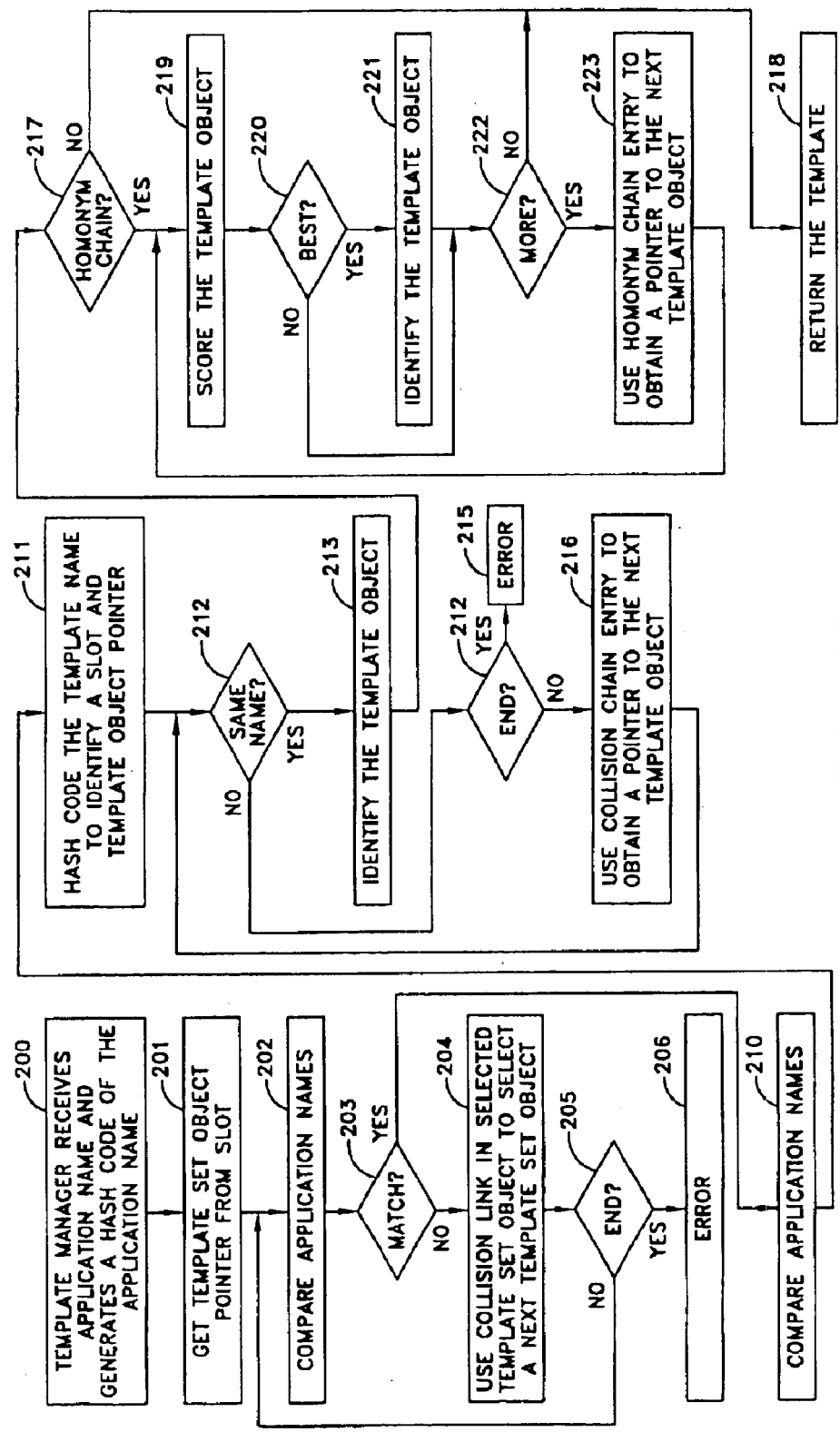

After the processes of FIGS. 8B or 8C-1 and 8C-2 have been completed after a first request for a template or upon receipt of a second or succeeding request for a template by an application, control transfers to step 200 in FIG. 8D where the templates manager method generates the hash code for the application name, if it has not done that step previously. This hash code identifies a slot in the templates manager hash table, such as the hash table 131 in FIG. 6B. Step 201 obtains the pointer from that hash table slot to identify a first Template Set Object. If the application names do not match, step 203 transfers control to step 204 to identify a next Template Set Object addressed from the same slot in the templates manager hash table (i.e., along the collision chain from the hash table in the templates manager object). If additional Template Set Objects are identified in the collision chain, step 205 returns control to step 202 to compare those application names. If the loop comprising steps 202 through 205 ends without identifying a matching name, an error condition exists as represented at 206.

When a match is found, step 203 transfers control to step 210 that calls the Template Set Object and its method. The Template Set Object method generates a hash code for the template name in step 211. This identifies a slot in the hash table, such as the hash table 136 in the Template Set Object of FIG. 6C. Step 212 determines if the first Template Object identified by the hash table slot in the Template Set Object has the same name as the requested template. If it does not, step 212 transfers control to step 213. If no additional entries in the collision chain exist, an error condition exists as represented at steps 214 and 215. If the collision chain identifies other Template Objects, step 216 identifies a next Template Object and control returns to step 212.

Figure 6D:
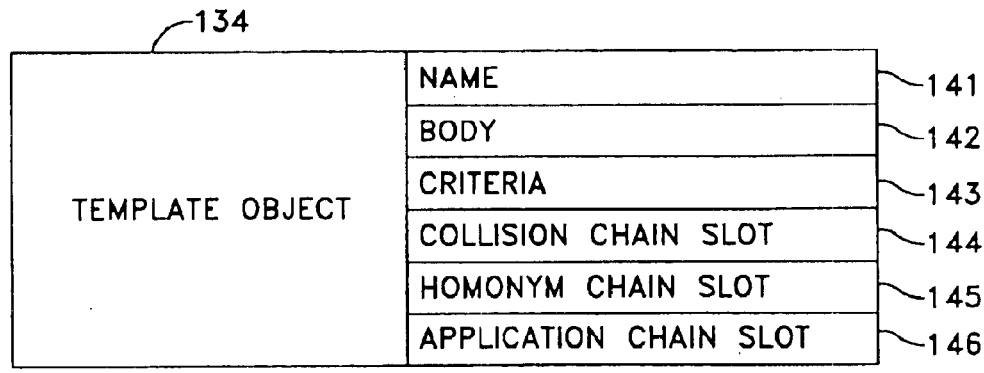

Once a Template Object is identified, step 212 transfers to step 213 that identifies the Template Object and looks to the homonym chain slot for that Template Object, such as the homonym chain slot 145 in the Template Object of FIG. 6D. If step 217 determines that no other Template Object exists for a template with the same name, control passes to step 218 that returns the template for use by the application.

If, however, step 217 determines that other Template Objects exist for templates with the same name, step 217 transfers control to step 219 that is a first step in a scoring procedure that scores each Template Object. As previously indicated, a Template Object contains in a criteria slot, such as the criteria slot 143 of the Template Object in FIG. 6D. A requesting application program will identify certain criteria. Other sources will supply other criteria. For example, the role model 56 in FIG. 1 will provide role model criteria. A template context object will include the browser type and other criteria. Step 219 matches the criteria in the context of the application and the criteria in the criteria slot for the Template Object being scored. For example, if the DrlPage Template Object for the APP2 application and if the application specifies Table D as a criterion, step 218 scores the DrlPage template 113 in FIG. 4 with a "−1" meaning there is no match, but the DrlPage template 114 with a "1". The scoring, for example, could be incremented for each criterion that is met.

After obtaining a score in step 219, step 220 determines if this score is the "best" score; that is, whether it is better than any previous score and not a "−1". If it is, control passes to step 221 to identify tentatively that Template Object as defining the template to be returned to the application. Otherwise control transfers to step 222 to identify any additional Template Objects in the homonym chain. If there are, step 223 uses the homonym chain to obtain a pointer to the next Template Object and control returns to step 219 to score the new Template Object.

Referring again to FIGS. 4 and 8D and assuming that the APP2 application requests the DrlPage template and specifies Table D, the scoring process shown in FIG. 8D initially examines the Template Objects for the DrlPage templates 113, 114 and 115 in sequence. As Table D is specified at a criterion, the Template Object for the DrlPage template 114 receives a score of "1". When that occurs, step 221 tentatively identifies the DrlPage template 114 as the template to be returned.

However, the scoring process in FIG. 8D continues for DrlPage template 115 as well as the Template Objects for the DrlPage templates 110, 111, 112 and 100 in that order. In each case, however, the scores will be "−1". When step 220 shifts to step 218, step 221 will have identified the DrlPage template 114 as the template to be returned.

Assume that the APP2 application requests a DrlPage template with Table A. In this case the first iteration of the scoring loop in FIG. 8D scores the DrlPage template 113 with a "1". It then scores the DrlPage templates 114 and 115 with a "−1" so step 221 continues to identify the DrlPage template 113. When the scoring process evaluates the DrlPage template 110, it also receives a score of "1" . However, that score is not "better than" the score assigned to the DrlPage template 113. Consequently, step 220 bypasses step 221 and template object identified by step 221 remains the DrlPage template 113. Thus the scoring sequence in FIG. 8D selects a template in a set with the same name that most closely matches the criteria set forth in an application. If more than one template has the same score, the template closest to the head of the homonym chain for the application, as determined by the positions of the Template Objects in the homonym chain for that template name, is selected.

Assume that the DrlPage templates 110 and 113 each have an additional criterion, namely that the application must be initiated by an administrator to display the DrlPage template 110 and by a user to display the DrlPage template 113. From the foregoing, it will be apparent that step 221 initially identifies the DrlPage template 113 because it receives a score of "1". However, the DrlPage template 110 receives a score of "2". In this case that is a "better" score, so step 221 identifies the DrlPage template 110 as the template to be returned if no other template receives a higher score. Thus, the scoring sequence can be characterized as selecting the Template Object with the first best score.

Template Hierarchy Example

Figure 9C:
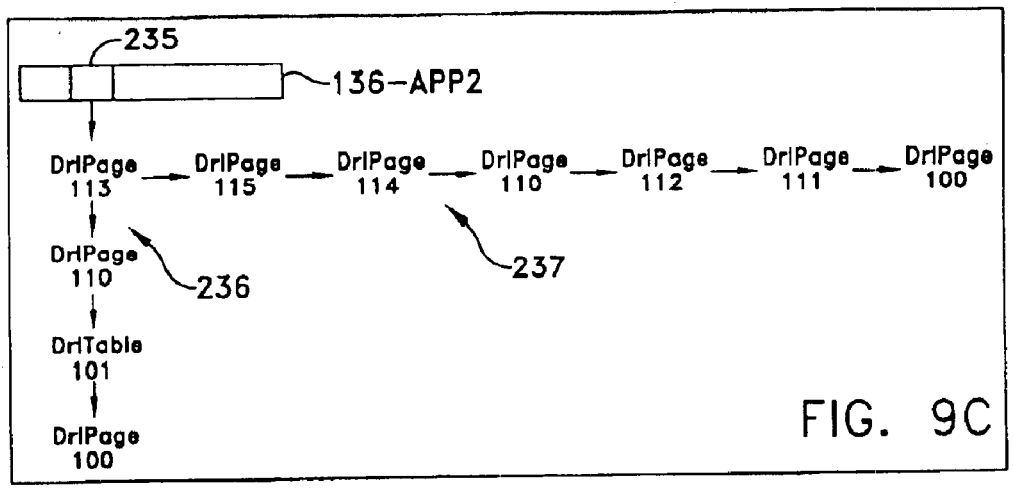
FIGS. 9A through 9C graphically depict different template hierarchies produced by different applications.
Figure 9B:
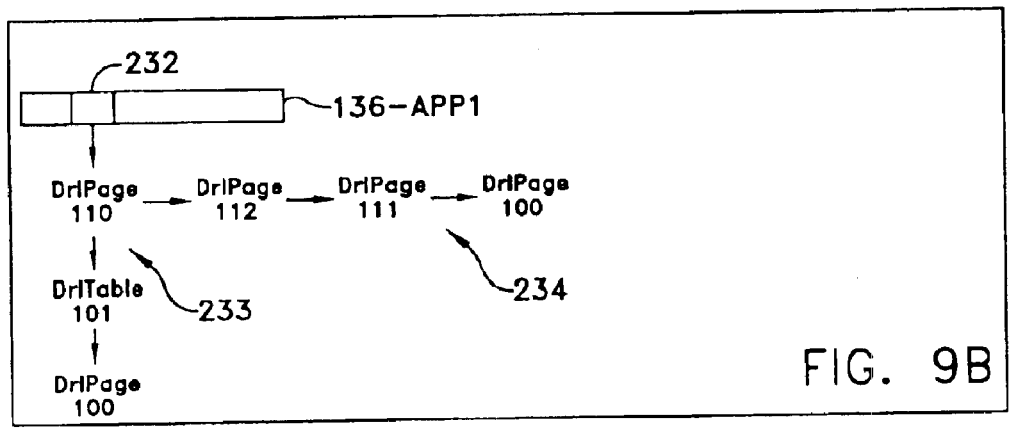
Figure 9A:
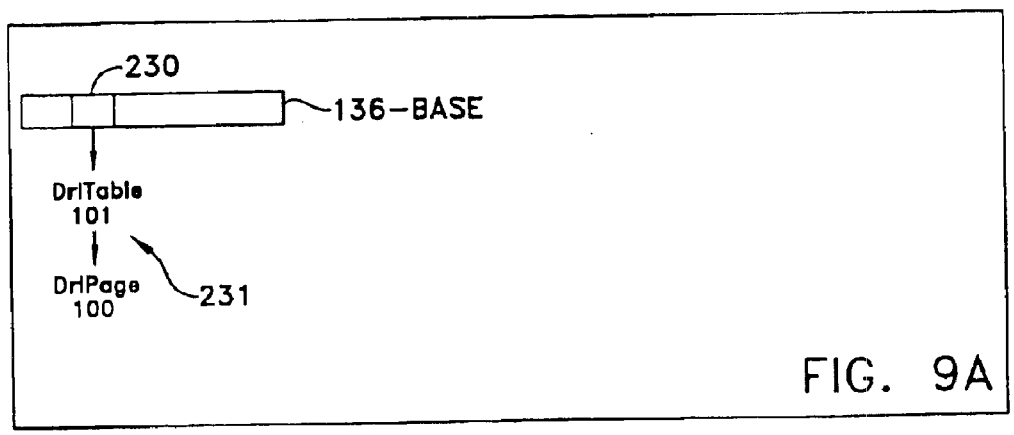

FIGS. 9A through 9C depict the hierarchy established by Template Set Objects for each of the layers shown in FIG. 4, assuming that the templates are analyzed FIGS. 8A through 8D in the order of their reference numbers and assuming that, in this example, the hash codes for "drlpage" and "drltable" happen to be the same. A Template Set Object for the base layer is generated using the process in FIG. 8B. When that process is complete, the hash table 136-BASE includes a slot 230 that points to the Template Object for the DrlTable 101. That Template Object includes a collision pointer to the Template Object for the DrlPage template 100. The homonym chains corresponding to the DrlTable and DrlPage templates point only to those two Template Objects as there are no other templates with those names in the base layer. In effect, the Template Object for a uniquely named template in the base layer lies at the head of its corresponding homonym chain that includes only that Template Object.

FIG. 9B depicts a hash code table 136-APP1 for the APP1 layer in FIG. 4. In accordance with the operation of FIGS. 8C-1 and 8C-2, a hash slot 232 points to the Template Object for the DrlPage template 110. A collision chain 233 then identifies the Template Objects inherited from the base layer, namely the DrlTable template 101 and DrlPage template 100 in sequence. At this layer, there are four templates with the same name. The Template object for the DrlPage 110 is at the head of the homonym chain 234, and the homonym chain 234 points in sequence to the Template Object for the DrlPage template 112, the Template Object for the DrlPage 111 and then to the Template Object for the DrlPage 100 for the inherited template. It should also be noted that the Template Object for the DrlPage template 100 at the bottom of the collision chain 233 does not have any Template Objects in a homonym chain extending from that Template Object.

Now referring to FIG. 9C, after the analysis of the APP2 layer, a slot 235 in the hash table 136-APP2 points to the Template Object for the DrlPage template 113 that lies at the head of a collision chain 236. The collision chain 236 points in succession to the Template Objects for the DrlPage template 110 inherited from the APP1 layer and the DrlTable template 101 and the DrlPage template 100 inherited from the base layer through the APP1 layer. At this layer, seven templates have the same "DrlPage" name. In accordance with FIGS. 8C-1 and 8C-2, the Template Object for the DrlPage template 113 is at the head of a homonym chain 237 for that template name. The homonym chain 237 defines a sequence of Template Objects that correspond to the DrlPage templates 115 and 114 from the APP2 layer, the DrlPage templates 110, 112 and 111 from the APP-1 layer and the Template Object for the DrlPage template 100 from the base layer.

As will be apparent the Template Set Objects in FIGS. 9A through 9C simplify the operation of the Template Set Object methods in FIG. 8D. Moving through the collision chains and homonym chains for any Template Set Object to identify a particular Template Object and corresponding template for return to the requesting application is a straightforward procedure. After the template is returned, the application can process that template and produce the necessary code for generating a web page image on a browser as previously described.

Figure 10:
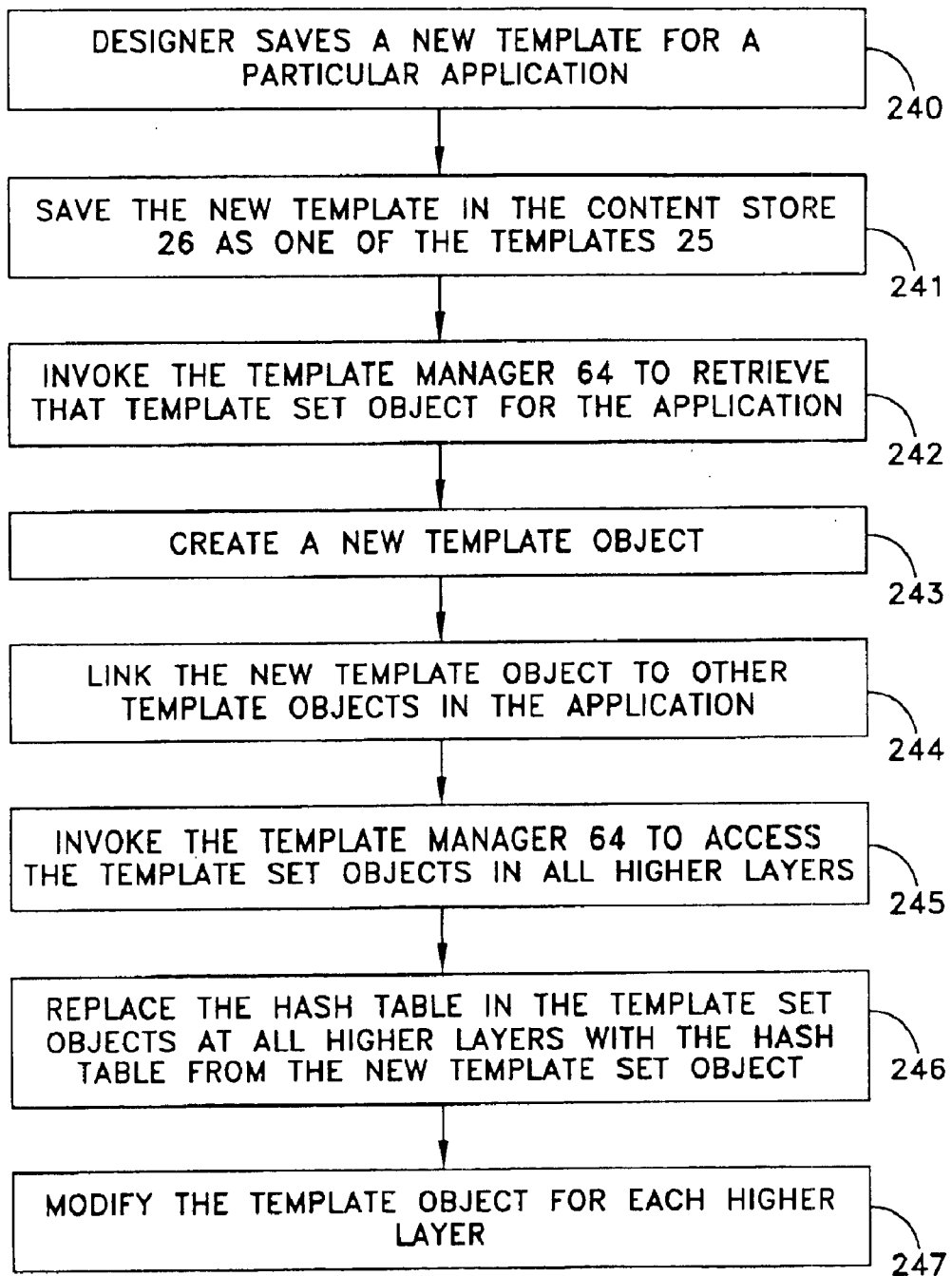
FIG. 10 depicts a method for adding a new template to the content store.

It is also possible for a web page developer or designer to author a new template for installation in an application. FIG. 10 depicts the process for adding such a new template. After the designer decides to save the new template in step 240, the application server 24 uses step 241 to save the new template in the templates store 25. With this act, step 242 invokes the templates manager 64 to retrieve the Template Set Object for the given application. Looking at FIG. 4, assuming that the new template is associated with the APP2 layer, the Template Set Object shown in FIG. 9B is selected.

Step 243 creates a new Template Object according to the structure shown in FIG. 6D. Step 244 then links the new Template Object to the other Template Objects in the application. Specifically, the new Template Object is inserted at the head of the applications link chain. In accordance with FIGS. 8C-1 and 8C-2 the new Template Object is inserted in the collision and homonym chains as appropriate. If the hash code for the template name defines a slot other than the slot 232 in FIG. 9B, that slot would point directly to the new Template Object. If the hash code were to identify the slot 232 and the template were to have a unique name, the process in FIG. 8C-2 would insert the new Template Object at the head of the collision chain 233; i.e., before the Template Object for the DrlPage template 110. If the new Template Object were named "DrlPage" then, in accordance with the operation of FIG. 8C-2, the new Template Object would be inserted in the homonym chain 234 between the Template Objects for the DrlPage templates 110 and 112, but not in the collision chain 233.

After these links have been completed, step 245 invokes the templates manager 64 to identify any applications at higher layers. In this example of FIG. 4, the APP2 layer represents a next higher layer. Step 246 replaces the hash table 136-APP2 with contents of the updated hash table 136-APP1. Step 247 then processes the Template Set Object for the higher layer (e.g., the Template Set Object in FIG. 9C by means of the methods in FIGS. 8C-1 and 8C-2) to further update the collision chain 236 and homonym chain 237 and to incorporate the other templates in the APP2 layer. Steps 245 through 247 then repeat for any higher layers in the application server 24.

Figure 11:
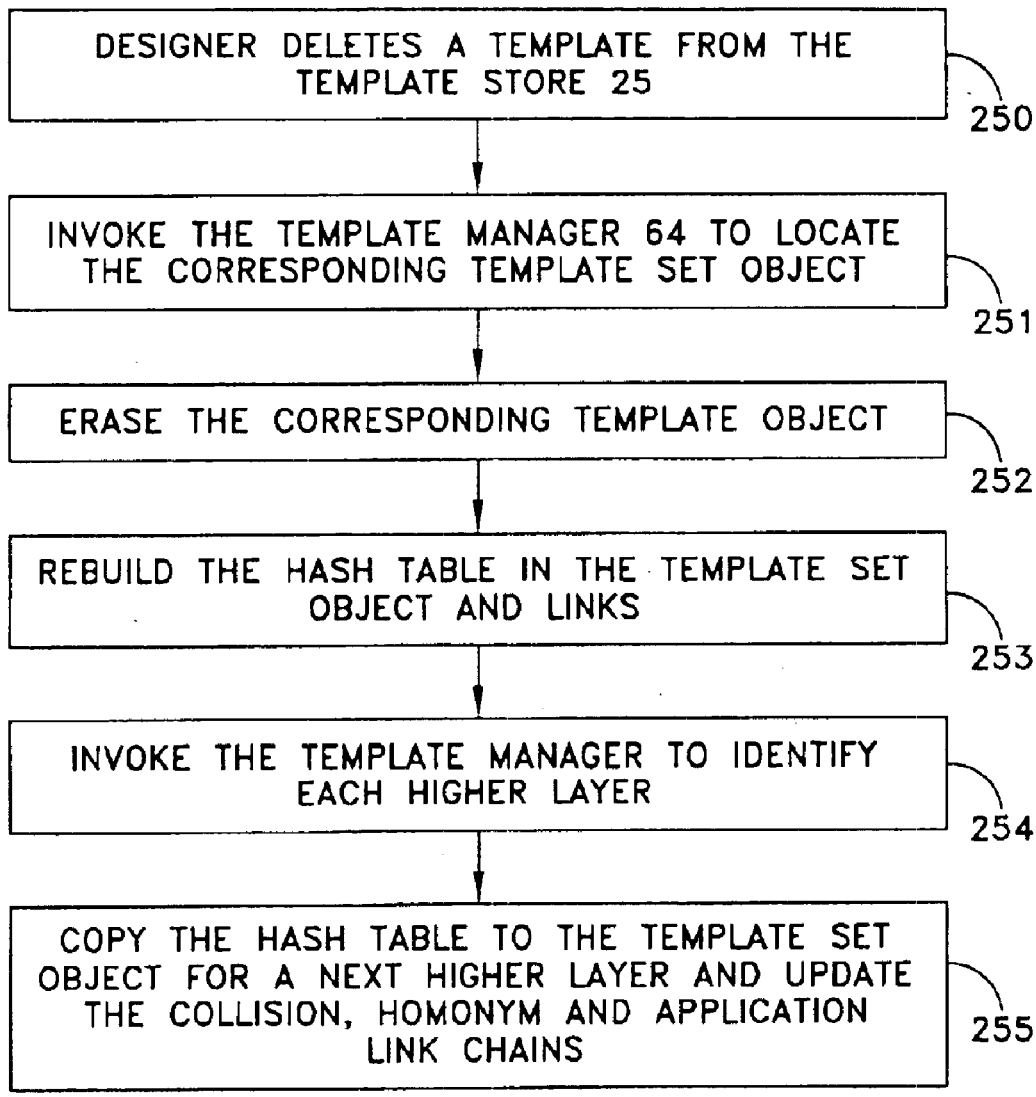
FIG. 11 depicts a method for deleting a template from the content store.

From time to time a developer may also decide to delete a particular template. As shown in FIG. 11, when a designer deletes a template, step 250 deletes that template from the templates store 25 and updates appropriate ones of the system and other tables. Step 251 then invokes the templates manager 64 to locate the corresponding Templates Set Object so that step 252 can erase the corresponding Template Object. Step 253 rebuilds the hash table and the application links, collision chain and homonym chain in the Template Set Object. Like step 245 in FIG. 10, step 254 in FIG. 11 invokes the templates manager 64 to identify each higher layer in succession. Step 255 then copies the hash table from the Template Set Object that included the deleted template to the Template Set Object for the next higher level and updates the hash table and the collision and homonym chains in that Template Set Object. The processes of steps 254 and 255 continue until all the Template Set Objects for higher layers have been updated.

Referring again to FIG. 1, the content store 26 also includes an images portion 57 for storing images to be used by applications and an image manager 65. Objects and methods analogous to the foregoing templates manager, template set and template objects and methods can be applied for facilitating the storage and retrieval of those images.

In summary, the architecture and organization shown in FIG. 1, as further supplemented by the disclosures related to FIGS. 2 through 11, provide a web page generator that meets the various objectives of this invention. It becomes very easy for a developer who is writing a new web page application to allow that application to inherit the appearance of prior applications and yet to allow the developer to customize that appearance without altering the appearance of an earlier application.

The template storage and retrieval methods in FIGS. 8 through 8D enable different templates to have the same name to further simplify the inheritance feature. Eliminating a requirement for unique template names allows a web page developer to use the content of the names for organizing the templates. For example, the DrlPage and DrlTable templates are useful in displaying table results. These names can then be used directly in different applications or in the same application, but each template can present a different web page appearance even with the same name. FIGS. 8A through 8D, 10 and 11 also demonstrate that changes to an application made by adding or deleting a template are reflected dynamically through the application server.

This system also prevents unexpected changes in one application from corrupting any other application in a development system. For example, assume that a developer completes and ships the APP2 application in FIG. 4 to a customer. Some time later assume that a change is made to the underlying APP1 application. That change will effect the APP2 application.

This invention also facilitates the separation of web page semantics and appearance. As will be apparent, the applications control web page semantics independently of and apart from the contents of templates. Similarly, the templates control the appearance of a web page independently of the applications. It has been found that this separation greatly simplifies the management of a web site and also facilitates the modification of web pages with respect to content and appearance. Further when it is desired to change a specific template in accordance with this invention, there is no requirement that any underlying template be changed.

Another advantage appears when a developer completes a web site development and packages that site for development. The template hierarchy and included relational data base simplify this packaging. The system manager, along with the system and data tables will identify each data table, application and template and JAVA class that is relevant to the complete web site package. It is a straightforward procedure to use these tools to retrieve all the information from a development system with multiple web site developments.

This invention has been disclosed in terms of a particular embodiment including a specific logical organization and specific objects and method implementations. It will be apparent that many modifications can be made to the disclosed organization, objects and methods without departing from the invention. For example, portions of the method in FIGS. 8B and 8C-1 and 8C-2 could be combined in a single block of code with appropriate condition statements. In the specifically disclosed embodiment, hash tables provide links to the various Templates Objects and applications. As known, there are other methods for providing such links that will perform the same functions as the specifically disclosed hash tables and related entry methods. A web page generator could use different modules to perform the specified functions. Therefore, it is the intent of the appended claims to cover all such variations and modifications as come within the true spirit and scope of this invention.

What is claimed as new and desired to be secured by Letters Patent of the United States is:

1. A web page generator for supplying web pages for display by a browser comprising:
    A) a template store with a plurality of templates, each template having a name, a body and selection criteria with at least two templates having the same name,
    B) an application store with at least one application that identifies templates by name,
    C) an interface for generating a modified user request that identifies one of said at least one application in said application store in response to a user request from a browser,
    D) an application manager responsive to the modified user request for processing a selected application including the identification at all the templates in said template store related to the application by name, and
    E) a templates manager for selecting, for each template name processed by said application manager, one of said named templates in said template store according to selection criteria from said application manager, said application manager producing a representation of a web page in response to the body of each selected template that said interface converts into a form that is compatible with the user's web browser.

2. A web page generator as recited in claim 1 wherein said templates manager includes means responsive to a first request for a template from an application for generating a template object for each template in the application and a template set object for the application, said template set object identifying each template object and each template object identifying a corresponding template for retrieval.

3. A web page generator as recited in claim 2 wherein said templates manager includes a pointer to the template set object for the application.

4. A web page generator as recited in claim 3 wherein each template set object generated by said templates manager has a plurality of pointers to groups of template objects, wherein all template objects for the same template name are identified by the same pointer and wherein a single pointer can refer to template objects of different names, said templates manager further including means for identifying a given pointer based upon a template name and means for thereafter selecting a specific template object and corresponding template from the identified group of template objects and templates.

5. A web page generator as recited in claim 4 wherein each template set object includes a pointer to a first location in a first chain of differently named template objects in the group and wherein each template object includes a pointer to another template object with the same name.

6. A web page generator as recited in claim 5 wherein each template object has a selection criterion associated therewith and the application defines at least one related criterion when the application identifies a template, said templates manager further including means for scoring each template object on the bases of a comparison of the application and template object criteria thereby to select a template object for use in the application.

7. A web page generator as recited in claim 6 wherein said scoring means includes means for giving a score to each template object and means for selecting from the template objects with the same name the template object with the first best score.

8. A web page generator as recited in claim 6 wherein said template set object has a host table with a plurality of hash slots and said templates manager has a hash code generator responsive to the template names for generating the pointer to a group of template objects.

9. A web page generator as recited in claim 5 wherein said web page generator includes a plurality of related applications organized as a base layer and at least one application layer, said template set generating means generating, for an application layer, a template set object that includes the template objects in the application, the base and application layers and any intervening application layers.

10. A web page generator as recited in claim 9 wherein said template set object and template objects identified in one hash slot contain pointers to the template objects in the application and base layers and intervening application layers.

11. A web page generator as recited in claim 10 wherein for any application layer the template set object and template objects for a given template name are organized in a second chain with pointers to template objects and templates having the same name whereby selection of a specific template object and template is based upon selection criteria from the application and in the template object.

12. A web page generator as recited in claim 11 wherein a pointer for each template object having the same name defines another template object to the same name and wherein the pointers collectively define a list of template objects that have the same name and that are ordered by their position in the application and base layers and any intervening application layers.

13. A web page generator as recited in claim 12 additionally comprising scoring means for selecting a specific template corresponding to a template object on the list of template objects, said scoring means including means for selecting from the list of templates with the same name the template with the first best score.

14. A web page development system comprising:
A) a template store for templates, each template having a name, a body and selection criteria,
B) an application store for applications that include references to templates by name,
C) means for developing a new template for a web page and saving the new template in said template store,
D) a templates manager that generates a template set object for that application identifies that template objects and corresponding templates and that includes:
  i) means responsive to the act of saving a new template for a given application for retrieving the template set object for the given application,
  ii) means for generating a template object including the new template name and reference to the given application, and
  iii) means for adding the new template object to the template set object at a predetermined location therein.

15. A web page development system as recited in claim 14 wherein said system has a base layer and applications organized in a hierarchy of application layers, said adding means includes base layer and application layer adding means for adding a new template object in the template set objects for the base layer and an application layer respectively.

16. A web page development system as recited in claim 15 wherein said application layer adding means includes means for incorporating information from corresponding template set objects from the base layer and any intervening application layers.

17. A web page development system as recited in claim 16 wherein each of said template set objects includes a hash table for identifying the location of template objects and wherein said application layer adding means includes means for copying each template set object hash table entry from a given layer to a corresponding template set object in a higher layer whereby the template set object for the higher layer inherits all of the templates in previous layers.

18. A web page development system as recited in claim 15 wherein a template is saved in the base layer, said base layer adding means including means for replicating certain information from the template set object for the base layer into each template set object in a higher layer in the hierarchy.

19. A web page development system as recited in claim 18 wherein the base layer template set object has a hash table with an entry for each template name and said base layer adding means includes means for incorporating the information in the hash table entry for the template being saved into the corresponding hash table entry for each template set object in a higher layer in the hierarchy.

20. A web page development system as recited in claim 19 wherein the template being saved has the same name as other templates identified in the template set object and wherein said incorporating means includes means for positioning template at a predetermined position in a homonym chain with pointers to templates with the same name.

21. A web page development system as recited in claim 20 wherein templates with the same name exist in different layers, said template positioning means including means for placing a pointer to be the first template object in the homonym chain in the template set object for the given application and for placing the pointer to the second position of the homonym chain for any higher application layer whereby in the higher application layer the pointer to the new template object is located immediately after the first template object in the homonym chain and before any previously processed template objects.

22. A web page development system as recited in claim 14 wherein the template set object includes pointers to a plurality of chains and wherein each chain can include a reference to a templates with different names, said adding means including means for storing a pointer to the template being saved at a predetermined position in a corresponding chain.

23. A web page development system as recited in claim 22 wherein the pointers to the plurality of chains is maintained in a hash table with a predetermined number of slots and wherein the hash code for one template name can be a duplicate of a hash code for another template name, said adding means including means for establishing a collision chain for each hash code identifying each template in the application layer, the base layer and any intervening layers identified by the same hash code.

24. A web page development system as recited in claim 23 wherein said adding means includes means for positioning the pointer to the template being saved at the beginning of the collision chain for the template set object corresponding to the application.

25. A web page development system as recited in claim 22 wherein the template being saved has the same name as other templates identified in the template set object and wherein said incorporating means includes means for positioning template at a predetermined position in a homonym chain with pointers for templates with the same name.

26. A web page development system as recited in claim 25 wherein templates with the saute name exist in different layers, said template positioning means including means for placing a pointer to be the first template object in the homonym chain in the template set object for the given application and for placing the pointer to the second position of the homonym chain for any higher application layer whereby in the higher application layer the pointer to the new template object is located immediately after the first template object in the homonym chain and before any previously processed template objects.

\* \* \* \* \*